US007155707B2

(12) United States Patent  
Clarke

(10) Patent No.: US 7,155,707 B2
(45) Date of Patent: Dec. 26, 2006

(54) COMPILING COMPUTER PROGRAMS INCLUDING BRANCH INSTRUCTIONS

(75) Inventor: Stephen Clarke, Sunnyvale, CA (US)

(73) Assignee: STMicroelectronics Limited, Almondsbury (GB)

( * ) Notice: Subject to any disclaimer, the term of this patent is extended or adjusted under 35 U.S.C. 154(b) by 572 days.

(21) Appl. No.: 09/977,048

(22) Filed: Oct. 12, 2001

(65) Prior Publication Data

US 2002/0078436 A1 Jun. 20, 2002

(30) Foreign Application Priority Data

Oct. 12, 2000 (GB) .................................. 0025052.2

(51) Int. Cl.
G06F 9/45 (2006.01)
G06F 9/44 (2006.01)
(52) U.S. Cl. ...................... 717/144; 717/142; 717/143; 717/128
(58) Field of Classification Search ......... 717/140–150
See application file for complete search history.

(56) References Cited

U.S. PATENT DOCUMENTS

| 5,450,588 | A | | 9/1995 | Hoxey | |
|---|---|---|---|---|---|
| 5,761,514 | A | * | 6/1998 | Aizikowitz et al. ......... | 717/158 |
| 5,812,850 | A | * | 9/1998 | Wimble ...................... | 717/131 |
| 5,961,637 | A | | 10/1999 | Sturges et al. | |
| 6,128,775 | A | * | 10/2000 | Chow et al. ................. | 717/156 |
| 6,260,190 | B1 | * | 7/2001 | Ju ............................... | 717/156 |
| 6,321,379 | B1 | * | 11/2001 | Callahan, II ................ | 717/141 |

FOREIGN PATENT DOCUMENTS

| EP | 0 481 615 A2 | 4/1992 |
|---|---|---|
| EP | 0 689 131 A1 | 12/1995 |
| WO | WO 00/38057 A2 | 6/2000 |

OTHER PUBLICATIONS

Standard European Search Report from British patent application No. 0025052, filed Oct. 12, 2001.
Standard European Search Report from British patent application No. 0025053, filed Oct. 12, 2001.
*An Evaluation of Branch Architectures*, DeRosa et al., 14th annual Intern'l Symposium on Computer Architecture, Pittsburgh, PA, Jun. 2-5, 1987, pp. 10-16, XP000212074.
*Register Allocation over the Program Dependence Graph*, Norris et al., ACM Sigplan Notices, US. Association for Computer Machinery, New York, vol. 29, No. 6, Jun. 1, 1994, pp. 266-277, XP000450423.
*Integrating Register Allocation and Instruction Scheduling for Riscs*, Bradlee et al., Computer Architecture News, US. Association for Computing Machinery, New York, vol. 19, No. 2, Apr. 1, 1991, pp. 122-131, XP000203255.

\* cited by examiner

Primary Examiner—Tuan Dam
Assistant Examiner—Chuck Kendall
(74) Attorney, Agent, or Firm—Lisa K. Jorgenson; James H. Morris; Wolf, Greenfield & Sacks, P.C.

(57) ABSTRACT

This patent describes a method of compiling a computer program from a sequence of computer instructions including a plurality of first, set branch, instructions which each identify a target address for a branch and a plurality of associated second, effect branch instructions which each implement a branch to a target address. The method comprising the steps of; reading the computer instructions in blocks; defining a set of target registers associated with each block for holding target addresses for the set branch instructions in that block; defining as a live range of blocks a set of blocks for which a target address of a particular set branch instruction is in a live state; and using the set of target registers and the live range to ensure that target registers holding target addresses in a live state are not available for other uses.

10 Claims, 7 Drawing Sheets

COMPILING COMPUTER PROGRAMS INCLUDING BRANCH INSTRUCTIONS

FIELD OF THE INVENTION

The present invention relates to the compilation of a computer program including branch instructions, and in particular to a method of compiling a computer program, a method of operating a compiler to compile a computer program and a compiler.

BACKGROUND TO THE INVENTION

Programs consist of blocks or strings of sequential instructions, which have a single entry point (the first instruction) and a single exit point (the last instruction). There can be a choice from a number of instruction blocks to be executed after any particular block. When there is more than one possible block, a condition must be used to determine which block to choose. The pattern of links between blocks is called the program's control or flow graph.

These blocks of instructions are packed together in memory. When there is no choice of subsequent block (block B), it can normally be placed immediately after the first block (block A). This means that there need not be any explicit change in control to get from block A to block B. Sometimes this is not possible, for instance, if more than one block has block B as a successor. All but one of these predecessors must indicate that the subsequent block will not be the next sequential block, but block B. These are unconditional branches. Some blocks have a choice of successor blocks. Clearly only one of the successors, for example block B, can be placed sequentially afterwards. The other block, block C, is indicated explicitly within block A. A conditional mechanism is used to determine which block is to be chosen. If the condition is met, then the chosen successor block is block C. If the condition is not met, then the chosen successor is block B. These are conditional branches.

Branches are well known in the art and are essential for a computer system to execute any program. Known computer systems contain a special register, the instruction pointer register, which provides an indication of the address of the next instruction to execute. This register is usually automatically incremented after an instruction executes, so that it now indicates the address of the next sequential instruction. Branch instructions are used to change this behaviour. These branch instructions specify an alternative address (the target location) for the next executable instruction. Conditional branch instructions also specify a condition which must be met for the alternative address to be used—otherwise the instruction pointer will be incremented as usual. These branch instructions thus define the end of a block of instructions.

In a non-pipelined computer system, the computer fetches, decodes and executes to completion one instruction, before moving on to the next instruction. However, in a pipelined system where fetch, decode and execution stages can all operate simultaneously on a stream of instructions, it is possible to fetch instructions which are not required. For instance, consider a system with a four stage instruction pipeline with fetch, decode, execute and write stages. The earliest that a branch instruction can be detected is in the decode stage, by which time the next sequential instruction in memory will have already been fetched. For an unconditional branch this must be thrown away, and new instructions fetched from the target location. For conditional branches it is more complicated. The condition must be evaluated to determine whether or not to change to the target location. This will occur in the execute stage, thus the sequentially fetched instruction must be stalled in the fetch stage, and only after the branch has been executed can the pipeline proceed. If the condition was true, then the sequentially fetched instruction must be ignored, and new instructions fetched from the target location. The first pipelining applied to any processor architecture is to issue instructions in advance, as this is one of the easiest speed-ups.

From the previous description, it is clear that the instruction after a branch instruction is always fetched, but is only sometimes required, and that therefore a pipeline bubble is created while determining what to do.

A branching architecture is known for example from EP-A-689131 wherein a branch is effected by the use of two separate instructions, a prepare to branch (PT) instruction (sometimes referred to herein as a set branch instruction) and an execute branch instruction (sometimes referred to herein as the effect branch instruction). The set branch instruction loads the destination address for the branch (referred to herein as the target address) into a target register. The effect branch instruction causes the processor control to transfer to the target address contained in the target register.

In a processor which comprises a program memory, instruction fetch circuitry and an execution unit, the transfer of the processor control can be handled in a number of ways. In one arrangement, two instruction fetch paths are provided, one providing instructions from the instant instruction sequence and the other providing instructions from the target address loaded by the branch set-up instruction. When the branch is effected at the effect branch instruction, the instructions loaded from the target address are switched over to supply the execution unit in place of those from the instant instruction sequence. Other implementations are possible and are discussed for example in the above-referenced EP-A-689131.

The advantage of such a so-called "split branch" arrangement is that it allows the set branch instruction to be moved earlier in the instruction stream. This means that the processor is informed of the branch destination (target address) sooner, and so is able to preload instructions starting from that target address so that by the time the effect branch instruction is taken, the instructions at the target are available to be executed. This is particularly useful in a pipelined architecture to avoid pipeline stalls which would otherwise occur while addresses were being fetched from a target address for a branch.

However, the effectiveness of implementation of the split-branch mechanism depends upon a compiler of the program to locate the set branch instructions at the best place in the instruction stream. There are a number of aims to optimise the placement of the set branch instructions.

1. In general, the earlier the set branch instructions are in the instruction stream, the more opportunity there is for the processor to preload branch target instructions, thus avoiding pipeline bubbles and speeding up execution.
2. For repeatedly executed branch instructions, such as those inside loops, it is possible to pull the set branch instruction completely outside of the loop. This reduces the number of times that they are executed and so improves code speed.

3. Branches which share the same destination address can share a target register, so only one per set branch instruction is necessary to set up the target register. This improves both code speed and code size.

However, there is a trade-off. Pulling the set branch instructions very early in an instruction stream may mean they are moved to a place where they are executed unnecessarily, because the effect branch instruction is never reached. That is, that particular branch is never taken because, for example, of intervening branches or conditions.

Also, the further the set branch instructions are from the branch instructions proper, the greater the pressure there is if there is a limited number of target registers in the processor. To utilise a limited number of target registers, which is sometimes a constrained resource in processors, it is necessary to reduce the distance between the set branch instruction and the effect branch instruction as far as possible in the instruction stream.

It is also important to make sure that a target register which has been loaded with a target address by a set branch instruction is not overwritten when the program is executed until the corresponding effect branch instruction has used the target address.

SUMMARY OF THE INVENTION

It is an aim of the present invention to be able to compile programs with improved locations of set branch instructions, while keeping track of target registers.

According to one aspect of the present invention there is provided a method of compiling a computer program from a sequence of computer instructions including a plurality of first, set branch, instructions which each identify a target address for a branch and a plurality of associated second, effect branch instructions which each implement a branch to a target address, the method comprising:

reading said computer instructions in blocks;
defining a set of target registers associated with each block for holding target addresses for the set branch instructions in that block;
defining as a live range of blocks a set of blocks for which a target address of a particular set branch instruction is in a live state; and
using said set of target registers and said live range to ensure that target registers holding target addresses in a live state are not available for other uses.

Another aspect of the invention provides a method of operating a computer system to compile a computer program from a sequence of computer instructions including a plurality of first, set branch instructions which each identify a target address for a branch and a plurality of second, effect branch instructions which each implement a branch to the target address specified in the associated set branch instruction, the method comprising:

executing a dominator tree constructor function in the computer system to read said computer instructions in blocks and to define a set of target registers associated with each block for holding target addresses for the set branch instructions in that block;
executing a live time tracking algorithm to define as a live range of blocks a set of blocks for which a target address of a particular set branch instruction is in a live state, said live time tracking algorithm being operable to use said set of target registers and said live range to ensure that target registers holding target addresses in a live state are not available for other uses.

The step of comparing can be carried out by storing the "best-so-far" candidate; or by holding cost parameters in a value table.

A further aspect of the invention provides a compiler for compiling a computer program from a sequence of computer instructions including a plurality of first, set branch instructions which each identify a target address for a branch and a plurality of associated second, effect branch instructions which implement a branch to the target address specified in the associated set branch instruction, the compiler comprising:

a dominator tree constructor for reading said computer instructions in blocks and for allocating each set branch instruction to an initial node in a dominator tree, said initial node being located in the block which contains the corresponding effect branch instruction;
means for defining a set of target registers associated with each block for holding target addresses for the set branch instructions in that block;
means for executing a live time tracking algorithm which defines as a live range of blocks a set of blocks for which a target address of a particular set branch instruction is in a live state, and which is arranged to use said set of target registers and said live range to ensure that target registers holding target addresses in a live state are not available for other uses.

Accordingly, in the described embodiment of the invention, while set branch instructions are migrated, the compiler keeps track of the "live" target registers to ensure that when the final program is executed, target registers holding "live" target addresses are not overwritten.

BRIEF DESCRIPTION OF THE DRAWINGS

For a better understanding of the present invention and to show how the same may be carried into effect reference will now be made by way of example to the accompanying drawings in which.

DESCRIPTION OF THE PREFERRED EMBODIMENTS

In the discussion which follows of the preferred embodiment of the present invention, an understanding of various basic compiler techniques is assumed.

In compiling a computer program, the program is first divided into functions which are implemented by groups of code sequences. The code sequences are referred to herein as blocks. Control-flow graphs are discussed from a compiler point of view in Section 9.4 and in Chapter 7 of "Compilers: Principles, Techniques and Tools", authored by Aho, Sethi & Ullmann and published by Addison-Wesley, 1986. A dominator tree of basis blocks is constructed from the control-flow graph, once again in accordance with known techniques.

Dominator trees are discussed in the Aho et al reference just referred to. One way of constructing them is disclosed in a paper entitled "A Fast Algorithm for Finding Dominators in a Flow Graph", ACM Transactions on Programming Languages and Systems (TOPLAS)", Vol. 1 No 1, July 1979, pages 121–141, authored by Thomas Lengauer and Robert Endre Tarjan, referred to herein by way of example.

Figure 1:
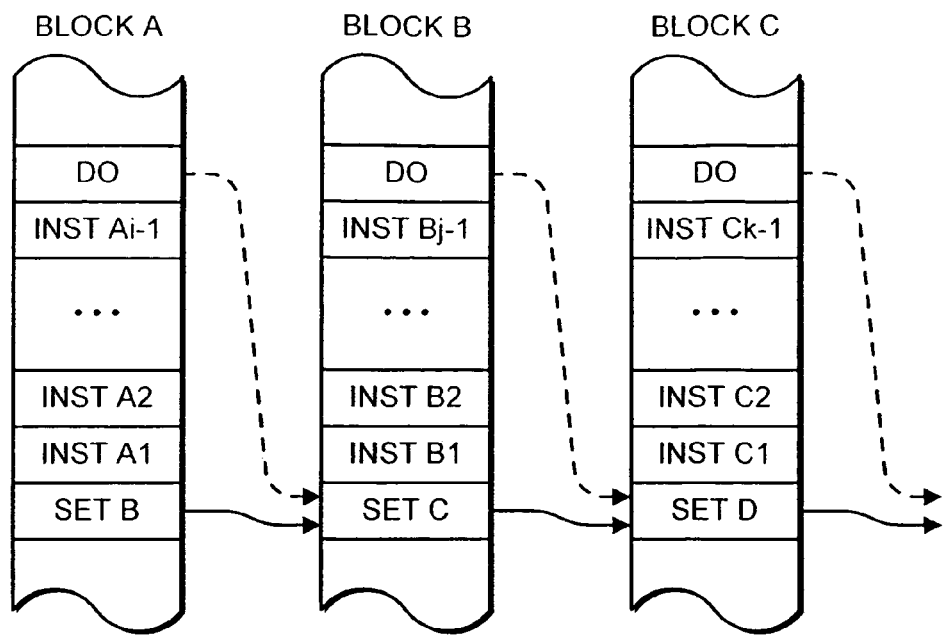
FIG. 1 is a schematic diagram illustrating split-branch instructions.

Before describing the compiling technique of the invention, reference will first be made to FIGS. 1 and 2 to explain the concept underlying the branching system of the present invention. FIG. 1 illustrates three blocks of instructions in memory, Block A, Block B and Block C. Each bock comprises a first instruction which in each case is a set branch instruction Set B. Set C, Set D, respectively, a sequence of subsequent instructions for example Inst A1, Inst A2 . . . Inst Ai-1 in Block A and a last instruction which in each case is an effect branch instruction referred to herein as Do. Assume that the sequence of instructions in Block A is being fetched, decoded and executed in a pipelined computer system. On execution of the first instruction Set B, a target location for a branch is stored, in this case identifying the memory address of the first instruction Set C of Block B. However, no action is taken at this stage other than to store the target location and possibly to set up the memory containing Block B, for an access, for example by moving the relevant memory addresses to a local cache. The instructions in Block A continue to be fetched, decoded and executed until the last instruction, Do, is being executed. Execution of this instruction causes an effect branch signal to be generated which causes the execution unit to address as its next instruction the target location set up by the set branch instruction Set B. Thus, the next instruction to be fetched from memory is the first instruction Set C of Block B. This is indicated by the dotted arrow in FIG. 1.

FIG. 1 illustrates the case for unconditional branches, that is branches that will inevitably be taken. FIG. 2 illustrates the position for conditional branches, that is branches that may or may not be taken depending on whether or not a condition which has been evaluated is satisfied FIG. 2 illustrates the case where a third instruction is used in addition to the set branch instruction and effect branch instruction described above with reference to FIG. 1. It is also possible to implement conditional branches using a conditional DO instruction.

Figure 2:
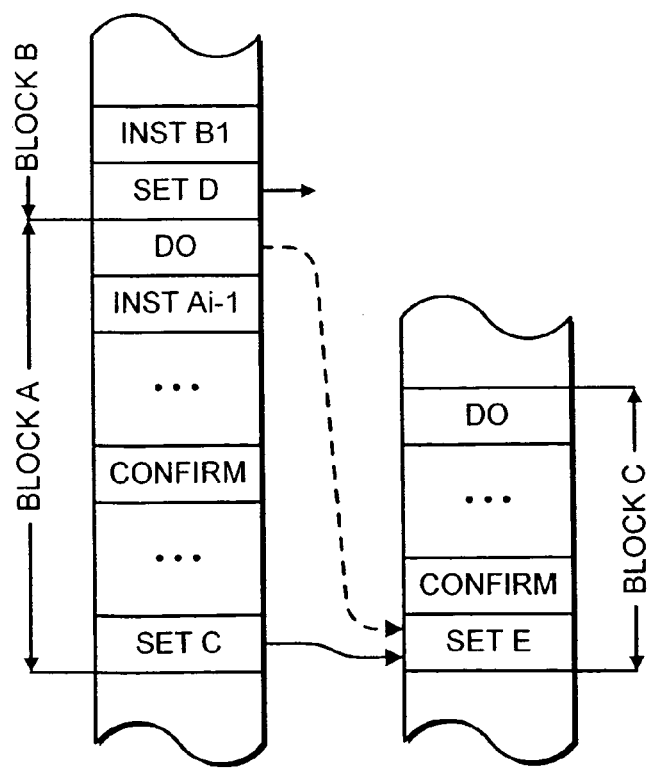
FIG. 2 is a schematic diagram illustrating split-branch instructions with conditions.

FIG. 2 illustrates three sequences of instructions held in memory as Block A, Block B, and Block C. Block B is shown contiguous to Block A and is arranged in memory such that if instructions are fetched from memory using sequential memory addresses then instructions will be normally fetched in the sequence of Block A followed by Block B. Block C is shown located elsewhere in memory. As in FIG. 1, each block comprises a first instruction which is a set branch instruction (Set C in Block A, Set D, in Block B and Set E in Block C). Block A then additionally comprises a sequence of instructions to be executed including a confirm instruction and the last instruction which is the effect branch instruction. As described above with reference to FIG. 1, instructions are fetched, decoded and executed. When the first instruction of Block A is executed it is identified as a set branch instruction with a target location identifying the memory address of the first instruction Set E in Block C Instructions in Block A continue to be fetched, decoded and executed until the confirm instruction is reached which has a condition associated with it. If the condition is satisfied, the branch is confirmed and execution of the effect branch DO at the end of block A will cause the branch identified by the target location to be taken as indicated by the dotted line in FIG. 2. Thus, the next instruction to be fetched, decoded and executed will be the first instruction Set E of Block C. If the confirm condition is not satisfied, the branch will not be taken when the effect branch instruction is executed but instead the next instruction to be fetched, decoded and executed will be the first instruction Set D of Block B which sequentially follows Block A in memory.

It will be appreciated that in order to implement branches as described above with reference to FIGS. 1 and 2, a target register must be provided for storing the target location indicated by the set branch instruction.

Figure 3A:
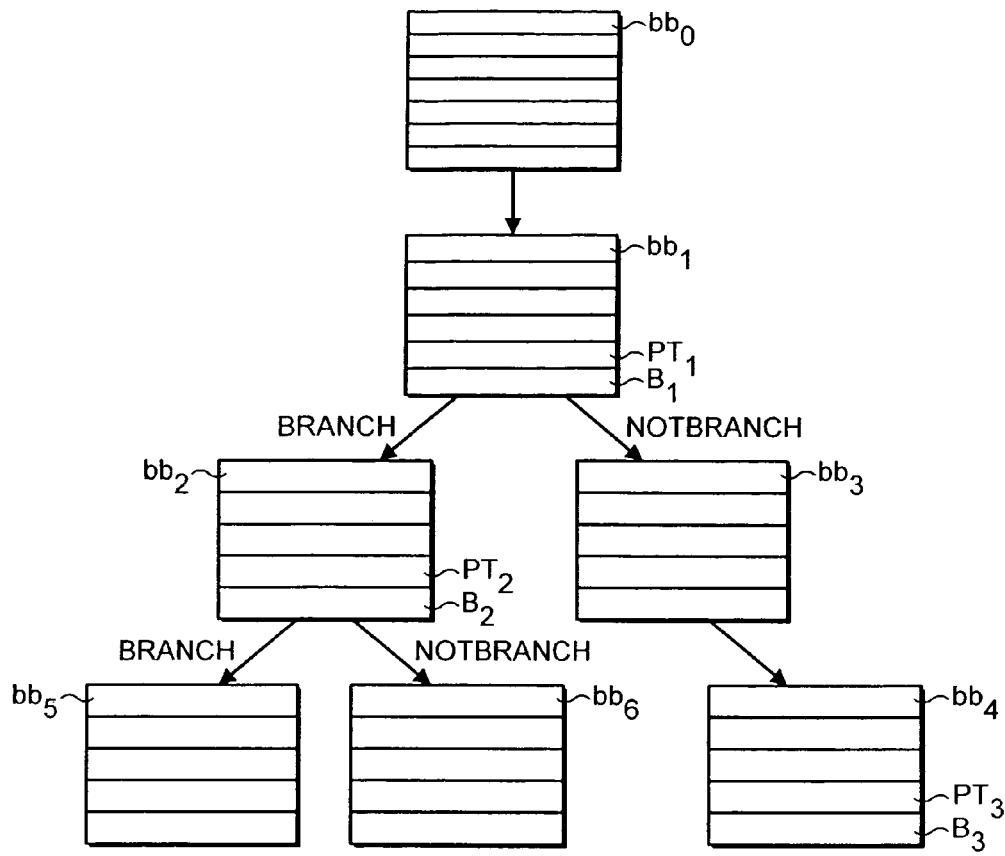
FIGS. 3A to 3C illustrate in general terms a control flow graph of a program prior to branch migration, a dominator tree for the control flow graph and the control flow graph of the program after compilation.
Figure 3B:
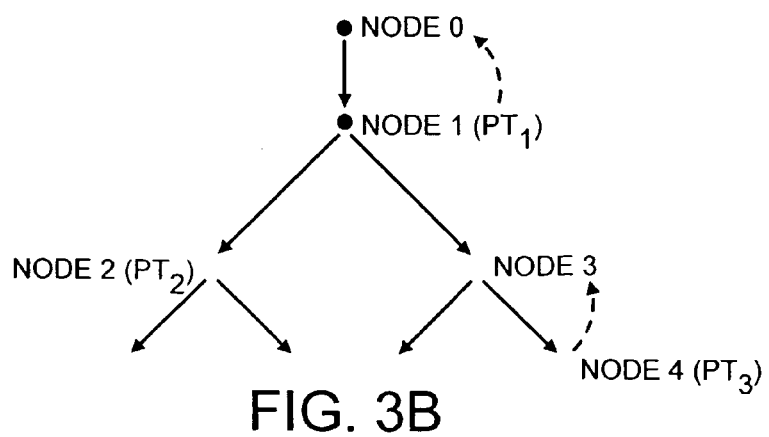
Figure 3C:
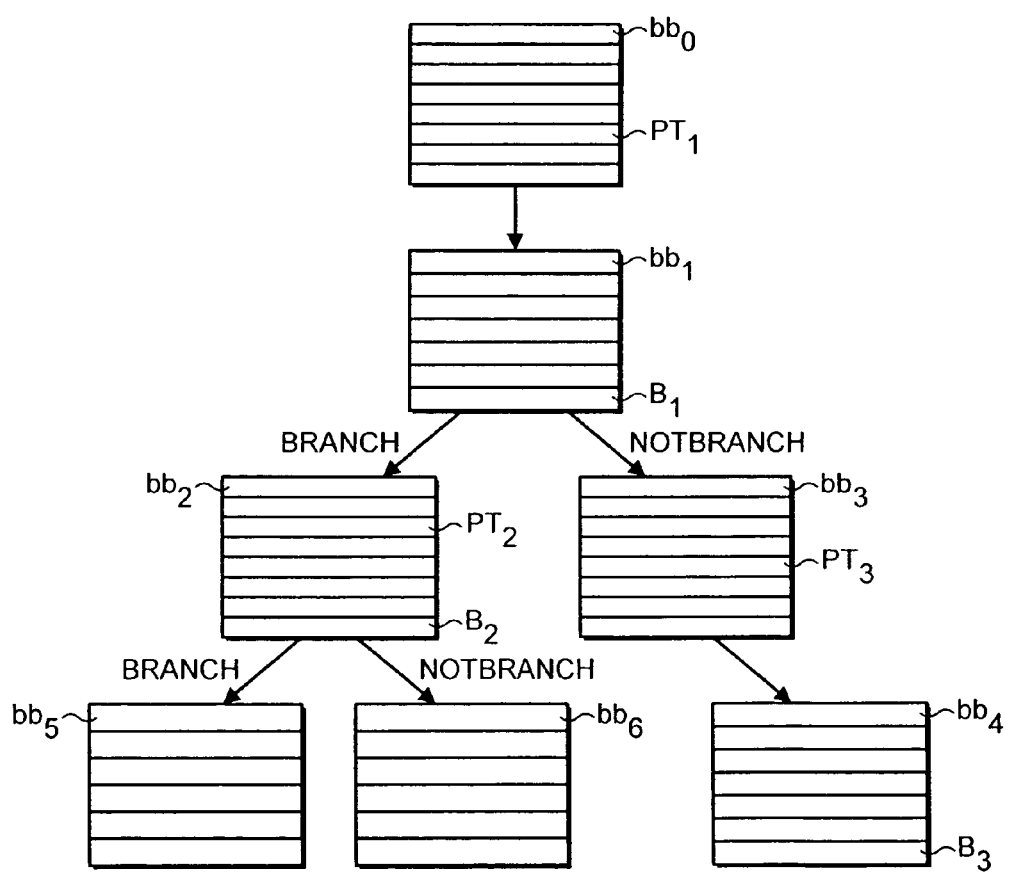

Reference will now be made to FIGS. 3A to 3C to describe the principles of the present invention In the following, set branch instructions are referred to as PT instructions. FIG. 3A shows the blocks bb in the control-flow graph of a function in the computer program to be compiled Each block contains a plurality of instructions of which only the set and the effect branch instructions are labelled. It is assumed that the instructions are being executed in order starting from the top of the control-flow graph, that is from the first instruction marked in block bb0. Prior to branch migration, the computer program is written so that in each block the set branch instruction is followed directly by its associated effect branch instruction. In the example of FIG. 3A, the block bb1 contains a set branch instruction $PT_1$ and its associated effect branch instruction B1. Depending on whether or not the branch is taken, the execution sequence would proceed from the blocks bb1 either to the block bb2 or the block bb3. This is denoted by the BRANCH and NOT BRANCH denotations on the arrows in FIG. 3A. The branch block, bb2 includes a set branch instruction $PT_2$ together with its associated effect branch instruction $B_2$. The not branch block bb3 has a successor block bb4. Block bb4 has a set branch instruction, $PT_3$ with its associated branch instruction, $B_3$.

Blocks bb5 and bb6 represent the branch and not branch alternatives for the effect branch instruction $B_2$ in the block bb2.

FIG. 3B illustrates the dominator tree for the control-flow graph of FIG. 3A. Each node in the dominator tree represents a basic block in the original control flow graph, for example NODE 0 represents bb0, NODE 1 represents bb1, etc. Each set branch instruction has an initial node in the dominator tree, which is the node representing the basic block containing the associated effect branch instruction. Thus, the initial node for the set branch instruction $PT_1$, which is labelled NODE 1 in FIG. 3B, is at the block bb1. The initial node for the set branch instruction $PT_2$ is at node 2 representing bb2. The initial node for the set branch instruction $PT_3$ is at node 4 representing block bb4 The compiler forms a priority list 20 which contains all of the set branch instructions in a priority order, the highest priority instructions being those that are executed most frequently. In the example of FIG. 3A, the priority order is $PT_1, PT_2, PT_3$.

For each PT instruction in priority order, the compiler analyses the effect of moving the PT instructions to each of the initial node's ancestors in the dominator tree. The benefit of migrating the PT instruction to each ancestor node is estimated using a cost heuristic, and the compiler chooses to migrate the PT instruction to the ancestor which has the greatest benefit based on this cost heuristic. Additionally, if the PT instruction is migrated to a node that dominates other branches to the same destination, then the PT instructions associated with those other branches can be deleted, and the migrated PT instruction used instead. This is advantageous in reducing the number of target registers required to hold target addresses from a number of set branch instructions. Another advantage is that the number of PT instructions is reduced, improving the speed and the size of the program FIG. 3C is one possible outcome following migration of the control flow graph of FIG. 3A. That is, the set branch instruction from node 4, $PT_3$ has been migrated to node 3 (as illustrated by the dotted line between node 4 and node 3 in the dominator tree of FIG. 3B. Similarly, the set branch instruction at node 1, $PT_1$ has been migrated to node zero. The set branch instruction at node 2, $PT_2$, has not been migrated to its ancestor.

The cost heuristic which is used to estimate the benefits of migrating the PT instruction will now be discussed in more detail.

The benefit of migrating a PT instruction from its initial block, $bb_{init}$, to another basic block, $bb_{new}$, is calculated as:

$$cost(PT, bb_{new}) - cost(PT, bb_{init})$$

where cost is an estimate of the run-time cost of placing the PT instruction in a particular candidate basic block, in terms of machine cycles. The compiler holds information about the ancestor node and the benefit for each potential migration.

If a PT instruction is being migrated to a basic block which dominates another PT instruction that computes the same target address, then the other PT can be deleted and its associated effect branch instruction rewritten to use the target address computed by the PT that is being migrated. This is done if it has positive benefit, where the benefit is defined as:

$$cost(PT, bb_{new}) - [cost(PT, bb_{init}) + cost(PT_2, bb2_{init})]$$

Where $cost(PT_2, bb2_{init})$ is the cost of the other (deleted) PT instruction in its initial basic block $bb2_{init}$.

So in general, if a PT instruction $PT_0$ is migrated from its initial node, $bb0_{init}$, to another basic block $bb0_{new}$, and in the process we are deleting n other PT instructions, $PT_1 \ldots PT_n$, then the benefit is calculated as:

$$cost(PT_0, bb0_{new}) - \sum_{x=0}^{n} cost(PT_x, bbx_{Init})$$

The basic cost is the pitch of a PT instruction multiplied by the execution frequency of the basic block bb. The pitch of the instruction is the number of cycles from when the PT is issued until another instruction can be issued, and is a property of the microarchitecture. The execution frequency is either estimated by the compiler, or obtained using profiling feedback information.

To the basic cost, further costs can be added depending on the circumstances:

i) It may be necessary to take into account the possibility of stalls occurring because the effect branch instruction accesses the target register before instructions from the target address have been prefetched. This can occur both when the PT instruction and the effect branch instruction are in the same basic block, and when they are in different basic blocks.

If they are in the same basic block, then the compiler determines how far the instruction can be pulled forward within that block. If this is not far enough to avoid stall cycles, then the compiler adds to the basic cost the number of stall cycles multiplied by the basic block's execution frequency.

If they are in different basic blocks, then it is not in general possible to estimate the distance between the PT and the effect branch instructions. However, if only a small number of instructions (e.g. 4–5) are required between the PT and the effect branch instructions to avoid stalling, then the accuracy of this is not quite so critical. The heuristic can recognise the case where the candidate basic block is the immediate predecessor of the block containing the effect branch instruction, and calculates the distance to be the size of the block containing the branch proper plus the number of instructions the PT can be placed before the end of the candidate basic block.

ii) If the migrated PT instruction would need to use a callee-save target register, then the cost of saving and restoring this target register on function entry and exit is added to the basic cost. This is the number of execution cycles required by the instructions that do the save and restore, multiplied by the execution frequency of the function entry-point.

A specific example will now be discussed.

Figure 4A:
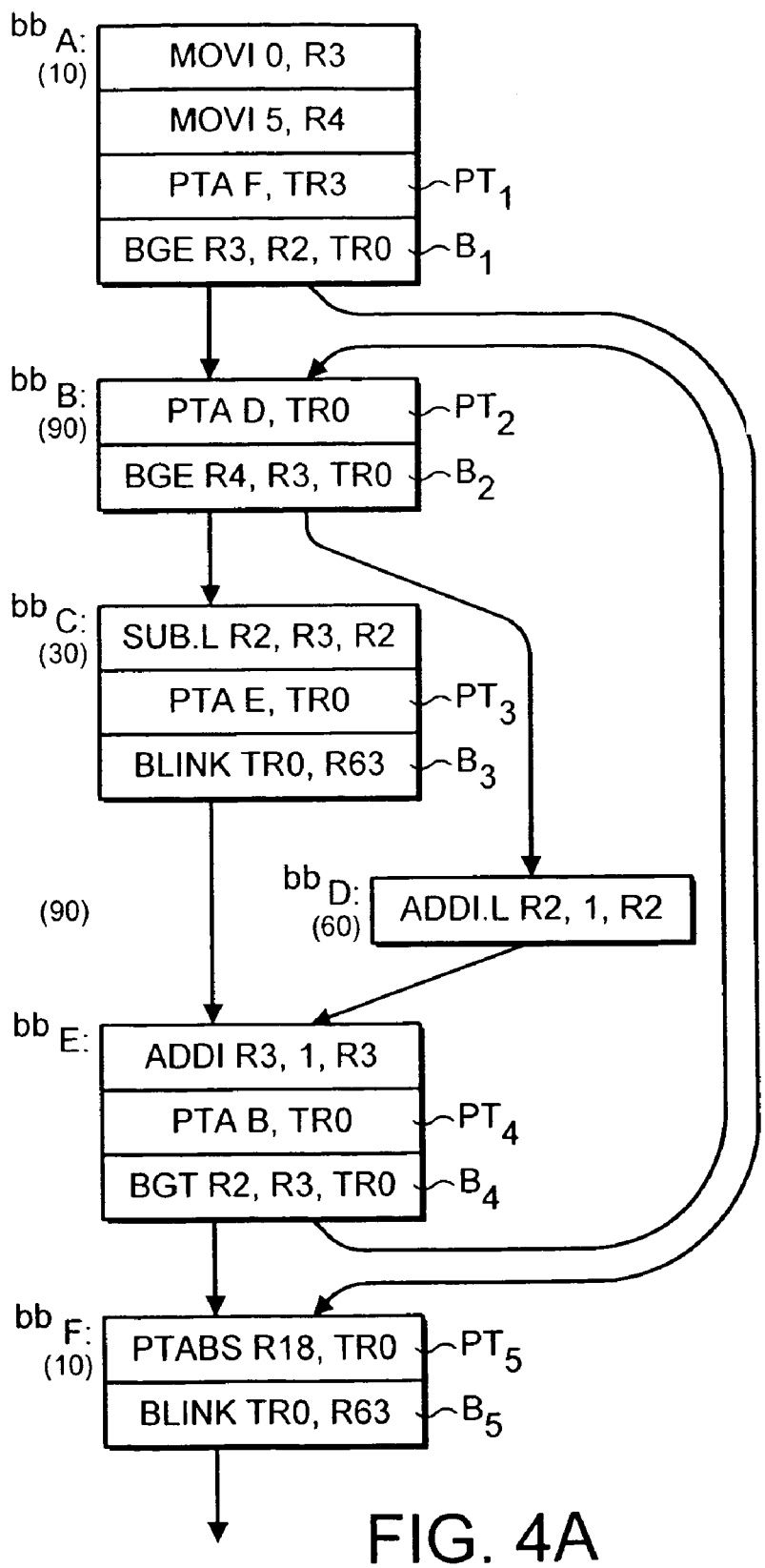
FIGS. 4A, 4B and 4C illustrate one specific example of a control flow graph for a code sequence prior to compilation, a dominator tree for the control flow graph and the control flow graph of the program after compilation.

FIG. 4A shows the control-flow graph prior to branch migration created from the following C code:

```
int fn (int c)
{
    int i;
    for (i = 0; i < c; i++)
    {
        if (i > 5)
            c-=i;
        else
            c++;
    }
    return c;
}
```

Figure 4B:
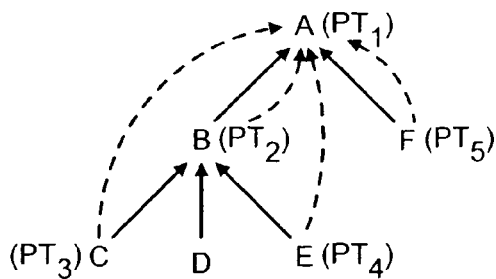
Figure 4C:
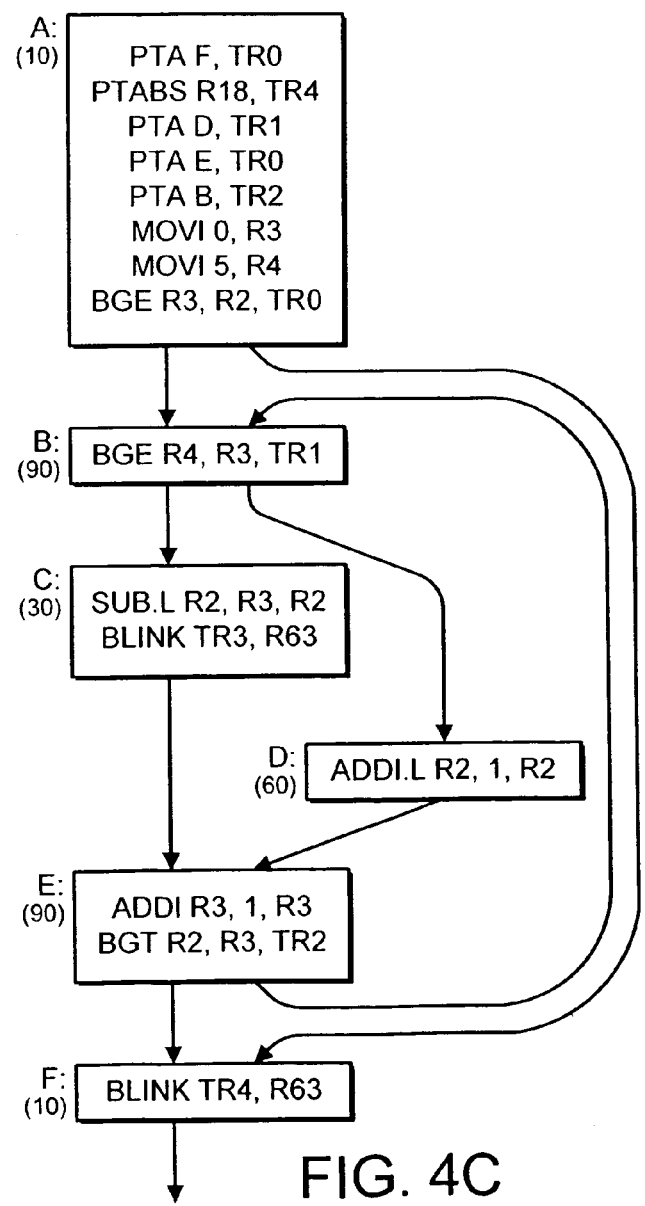

The dominator tree for this control-flow graph is shown in FIG. 4B. The control flow graph for the program after branch migration is shown in FIG. 4C.

In FIG. 4A, the blocks are labelled with their execution frequency, for example, block C has an execution frequency of 30. Each block has a sequence of instructions and the blocks A to F together implement the function fn ().

Before discussing the example illustrated in FIGS. 4A to 4C, for the sake of completeness an explanation of each of the illustrated instructions is given below:

MOVI<IMM>,R—loads the specified immediate value (IMM) into the identified register R3;

PTA F,TR3—loads the address of block F into the target register TR3;

BGE R3,R2,TR0—effects a branch if R3 is greater than or equal to R2, to the address contained in the target register TR0;

SUB.L.R2,R3,R2—subtracts the value in register R3 from the value in register R2 and loads the result into register R2;

BLINK TR0,R63—effects an unconditional branch to the address contained in TR0;

ADDI.L R2,1,R2—increments the value in register R2 by one and loads the result into R2;

BGT R2,R3,TR0—effects a branch if the value in register R2 exceeds the value in register R3, to the destination address contained in target register TR0;

PTABS R18,TR0—loads the value of register R18 into the target register TR0.

Blocks A, B, C, E and F each contain PT instructions which are labelled respectively PT1, PT2, PT3, PT4 and PT5. Their associated branch instructions are, in this example, each located in the same basic block bb and are labelled B1, B2, B3, B4 and B5 respectively. Firstly, the compiler makes a list of the PT instructions in order of priority based on their frequency of execution. In the present example, this is PT2, PT4, PT3, PT1, PT5. The frequency of execution is the number given in brackets below each block designator.

The nodes in the dominator tree are illustrated in FIG. 4B. Each node is marked with the PT instruction which is located at that node according to the compiler algorithm.

The PT instruction PT2 would be analysed first, but the principles of analysis are discussed below with reference to the next instruction PT3 in block C. The dominator tree tells us the blocks to which this PT could be migrated: they are blocks B and A, the ancestors of block C. The costs for the original block, C, and blocks B and A are calculated as follows:

Block C The basic cost is the frequency of the block multiplied by the pitch of the PT instruction, If we take the pitch to be two cycles, then the basic cost is 30×2=60.

However, in block C, only one instruction (the SUB.L) can be placed between the PT and the branch instruction that uses the value, so additional stall cycles are incurred. If there are three stall cycles, then an additional 3×30=90 is added to the basic cost, making the total cost 150.

Block B The execution frequency of block B, is 90, the pitch of the PT is 2, so the basic cost is 90×2=180.

Block B is a predecessor of the initial block (block C), so the cost heuristic will again take into account the potential for stall cycles. If the PT is placed in block B, then two instructions can be placed between it and the branch that uses its value: the BGE from block B, and the SUB.L from block C, this is still not enough to avoid stall cycles. There are two stall cycles, so an additional 2×90=180 is added to the basic cost, making the total cost 360.

The benefit of migrating the PT from block C to block B is the difference between the cost in block C and the cost in block B, i.e. 150−360=−210. In this case the benefit is negative, i.e. migrating to block B. will make the code slower.

Block A The execution frequency of block A is 10, so the basic cost in block A is 10×2=20.

As block A is neither the initial block (C) nor a predecessor of the initial block, no extra cost is added to account for stall cycles.

The benefit of migrating the PT from block C to block A is 150−20=130. In this case, the benefit is positive, so it is worthwhile to migrate the PT to block A.

We would choose to migrate the PT to the block with the greatest benefit, which is block A.

The migration of $PT_3$ is illustrated in the dominator tree of FIG. 4B by a dotted line. Likewise, the migrations of the other set branch instructions are so illustrated. FIG. 4C shows the control flow graph of the program after compilation. As can be seen, all of the set branch instructions have in fact been migrated into block A. It will be noted that this has involved the use of different target registers, TR1, TR2 and TR3 in place of the target register TR0 in the original set branch instructions. This is because it is now necessary to set up four target locations in separate registers which will not be utilised until the effect branch instructions are reached.

Figure 5:
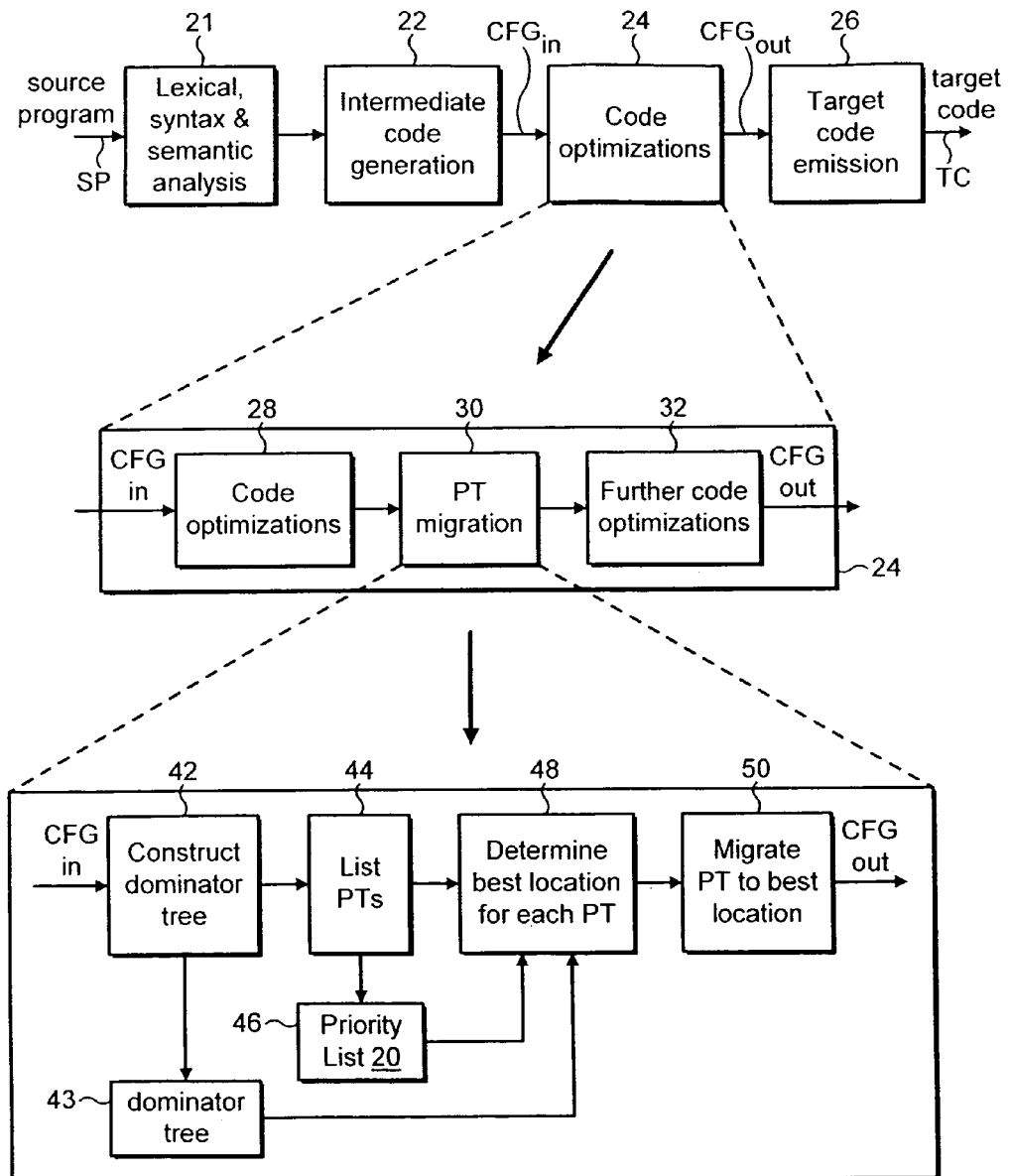
FIG. 5 is a block diagram of a compiler.

FIG. 5 shows a block diagram of a compiler at three levels. The diagram is in schematic form only, with square blocks illustrating the functions implemented by the compiler. Along the top of FIG. 5 are shown the four main functional blocks of the compiler. A source program SP is supplied to an analysis block 21 which carries out lexical syntax and semantic analysis on the source program. The results of that analysis are supplied to an intermediate code generation block 22 which generates code in an intermediate format in which optimisation can be accomplished. This optimisation is carried out by a code optimisation block 24. Finally, target code TC is emitted via a target code emission block 26.

The code optimisation block 24 is shown in expanded format in the second line of FIG. 5. It receives the control flow graph CFG generated by the intermediate code generation block 22. A first code optimisation block 28 carries out preliminary optimisations on the control flow graph $CFG_{IN}$. A PT migration block 30 then acts to migrate the branch instructions as discussed above. Finally, a further code optimisation block 32 carries out final optimisations on the code and generates an output control flow graph $CFG_{OUT}$ which is supplied to the target code emission block 26 The PT migration block 30 is shown in more detail in the lower part of FIG. 5.

The PT migration block 30 includes a dominator tree constructor 42 which receives the input in the form of the control-flow graph $CFG_{IN}$ as illustrated for example in FIGS. 3A and 4A and is responsible for reading the instruction blocks bb and generating the dominator tree 43, an example of which has been discussed with reference to FIGS. 3B and 4B. A lister 44 lists the set branch instructions in order of priority to generate the priority list 20. The priority list 20 is held in a store 46 in the compiler. A cost heuristic 48 determines the benefit for each potential migration of the PT instructions and holds the "best-so-far" candidate, which is the candidate with the minimum cost so far. The initial "best-so-far" candidate is the initial node. When a candidate is found with a lower cost than the "best-so-far" candidate, that candidate is made the new "best-so-far" candidate.

After the cost heuristic 48 has determined the best location for each set branch instruction, a migration block 50 migrates the set branch instruction to the best location. Finally, the output control flow graph $CFG_{OUT}$ is generated by the migration block 50.

As an alternative to holding the "best-so-far" candidate, a value table can be used which loads the values determined by the cost heuristic 48 defining the benefit for each potential migration of the PT instructions. That value table can then be used to determine the best location for the set branch instructions in the final program. It will readily be appreciated that other alternative implementations are possible in the compiler.

In order for a set branch instruction to be migratable, there needs to be a target register free in the final processor on which the code will be executed to hold the branch destination address throughout the time that it may be required by branch instructions, This is termed herein the "lifetime" of the target register. In most processors, target registers are a constrained resource and therefore it is not normally possible just to have available a large enough number of target registers to ensure that there is always one free. Reuse of target registers imposes a constraint on split branch semantics. To alleviate this, there is described below an algorithm which tracks the lifetimes of target registers. The algorithm has been created in a manner such that it uses an incremental technique to maintain the lifetimes of target registers, as PT instructions are migrated, thereby to reduce computational time.

When a PT instruction is to be migrated, the target address that it computes is loaded into a target register which is "live" at all instructions between the PT instruction and the branch instruction that uses that target address. It is necessary to ensure that the target register selected to hold that target address is not used for any other purpose between the PT and the branch. This is achieved by calculating a "live range" of the target address, and ensuring that the target register has no other uses within that live range. The "live range" is the set of basic blocks in which the target address for the PT instruction needs to be live, i.e. it has been calculated by the PT, but not yet used by the branch.

Each basic block in the control-flow graph has an attribute, $bb_{live\_tars}$, the set of target registers in use at some point in that block. In the initial generated code, only the target register TR0 is used, so initially for each basic block the attribute $bb_{live\_tars}$ is the set {TR0}. However, called functions can use caller-save target registers, so for basic blocks containing function calls $bb_{live\_tars}$ also includes the caller-save target registers. As PT instructions are migrated, and new target registers allocated, then for each basic block in the newly allocated target register's live range, the attribute $bb_{live\_tars}$ is updated to include the newly allocated target register.

Given a live range L for a particular target address, we can therefore calculate the set of target registers used in that live range by forming the union of the attribute $bb_{live\_tars}$ sets for each basic block in L.

Calculating individual live ranges is in general an iterative dataflow problem and can be time-consuming. However, we can take advantage of some features of the problem we are solving to speed up the live range calculations.

The live ranges to be computed are formed as we walk up the dominator tree finding candidate basic blocks to migrate to.

For the initial position $bb_{init}$, the live range is simply the set {$bb_{init}$}. As we move up the dominator tree from a node bb to its parent $bb_{parent}$, then given the live range at bb, we can calculate the live range at $bb_{parent}$ using the following algorithm;

---

"live range at bb_parent" = "live range at bb" union { bb_parent };
workset = live range at bb;
while (workset is not empty}
{
take block from workset;
if block is not already in "live range at bb_parent" then
{
add block to "live range at bb_parent";
for each predecessor of block,
    if predecessor is not already in "live range at bb_parent"
        add predecessor to workset;
}
}

---

This algorithm walks the control-flow graph from each basic block in the existing live range towards the root of the graph. As $bb_{parent}$ dominates all blocks in the existing live range, all walks from a member of the existing live range towards the root of the graph are guaranteed to reach $bb_{parent}$ and thus terminate (loops in the control-flow graph are avoided by not visiting a block that has been visited previously).

To save computational time, the set of target registers used in a live range is computed at the same time that the live range is computed, also incrementally; i.e. given a live range L which uses target registers $T_L$, if basic block bb is added to L then the augmented live range uses the set of target registers $T_L$ union $bb_{live\_tars}$.

As the dominator tree is walked to find the best basic block for a PT to migrate to, it is possible to encounter a block that dominates another branch to the same location. In this case that branch can be changed to use the target address calculated by the PT instruction that is being migrated. The PT instruction that is associated with that branch can be deleted. However, if the branch is changed to use the PT instruction under migration then the live range of the migrated PT target address must be updated. Incremental live range calculation can be updated to handle this case fairly straightforwardly by observing that the new branch is dominated by some block in the current live range, therefore a control-flow graph walk from the new branch towards the root of the control-flow graph will always reach the live range. So given the live range at basic block bb, and a branch instruction in $bb_{branch}$, the following algorithm will calculate the new live range if the branch is rewritten to use the target address calculated by the migrated PT instruction:

---

"new live range" = "live range at bb";
workset + { bb_branch };
while (workset is not empty }
{
    take block from workset;
    if block is not already in "new live range" then
{
    add block to "new live range";
    for each predecessor of block,
        if predecessor is not already in "new live range"
            add predecessor to workset;
}
}

---

This is just a minor variation on the incremental live range calculation when walking up the dominator tree, and it is straightforward to share code for both calculations.

Figure 6A:
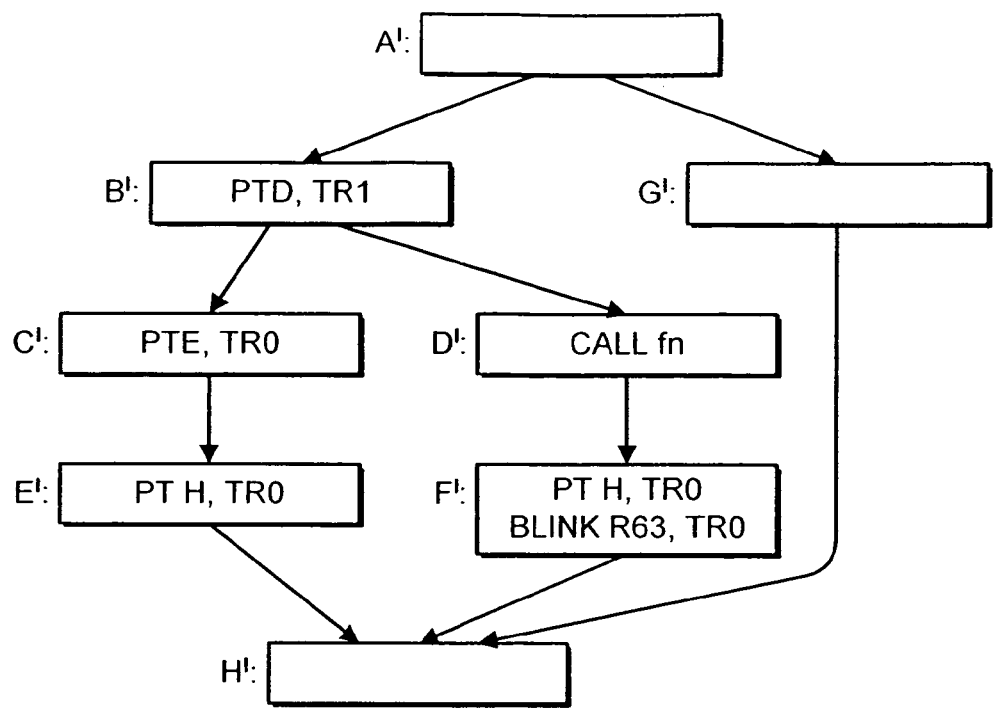
FIGS. 6A and 6B illustrate another example of a control flow graph and a dominator tree for the control flow graph.
Figure 6B:
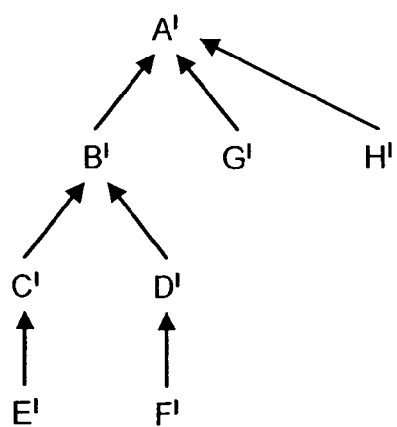

Reference will now be made to a specific example in conjunction with FIGS. 6A and 6B. FIG. 6A is an example control flow graph of the type already illustrated in FIG. 4A. To distinguish the block references from those in FIG. 4A, the blocks are referred to with primes, that is A', B', C', D', E', F', G' and H'. The detail of the code inside each block is not given. Only the code in blocks E' and F' are illustrated. These blocks both contain set branch instructions as follows:

--- block E' PTH,TR0
block F' PTH,TR0.

---

The effect of migrating the PT instruction in block E' is analysed first. The initial live range is {E'}. The effect of migrating the PT instruction to the dominator of block E', i.e. block C' is analysed using the cost heuristic discussed above. At this point the live range becomes {C',E'}.

The next possible location is block B' and the live range is consequently {B',C',E'}. It can be seen at this point from both the control flow graph in FIG. 3A and the dominator tree of FIG. 3B that at this point the PT instruction in block F' is dominated. As this instruction is thus now duplicated the prepare to branch semantics of the set branch instruction in block E' so it can effectively be replaced by the PT instruction under migration. This has the consequence that the target address calculated by the PT instruction under migration must reach the effect branch instruction (BLINK R63,TR0) in block F. Thus, the live range now covers {B',C',E',D',F'}.

In the above process, each block has an attribute $bb_{live\_tars}$ as shown in Table I

TABLE I $bb_{live\_tars}(B')=\{TR1\}$
$bb_{live\_tars}(C')=\{TR0\}$
$bb_{live\_tars}(D')=\{TR0, TR1, TR2, TR3\}$
$bb_{live\_tars}(E')=\{TR0\}$
$bb_{live\_tars}(F')=\{TR0\}$ Note in particular that Block D' contains a function call CALL fn and thus must be assumed to modify all caller-save target registers. The caller-save target registers are defined by the target applications binary interface (ABI) the compiler is using. In this example we have assumed the caller-save target registers are TR0, TR1, TR2 and TR3. When the effect of migrating the PT instruction in block E' is analysed, the initial live range is {E'}, and the set of target registers is union E', $bb_{live\_tars}(E')$, i.e. TR0. When the live range changes to {C,E} as explained above, the set of target registers still contains just TR0. Thus, if the PT instruction is migrated to block C', any target registers other than TR0 may be used to contain the target address When the live range changes to {B',C',E',D',F'}, the set of target registers is {TR0,TR1,TR2,TR3}. Thus, none of these four target registers may be used to hold the target address.

The invention claimed is:

1. A method of compiling a computer program from a sequence of computer instructions, the method comprising:
   reading, in blocks said computer instructions including a plurality of first, set branch, instructions which each identify a target address for a branch and a plurality of associated second, effect branch instructions which each implement a branch to a target address;
   defining a set of target registers associated with each block for holding target addresses for the set branch instructions in that block;
   defining as a live range of blocks a set of blocks for which a target address of a particular set branch instruction is in a live state;
   using said set of target registers and said live range to ensure that target registers holding target addresses in a live state are not available for other uses;
   for each set branch instruction, allocating the set branch instruction to a respective initial node in a dominator tree, said initial node being the node which contains the effect branch instruction corresponding to the set branch instruction;
   determining an ancestor node in the dominator tree to which to migrate one or more of the branch instructions based on the live range of blocks so that target registers holding target addresses in a live state are not overwritten when the computer instructions are executed; and
   migrating one or more said branch instruction to the ancestor node.

2. A method according to claim 1, wherein, during said step of migrating said at least one set branch instruction, the live range of blocks is incrementally updated.

3. A method according to claim 2, wherein during said step of migrating said at least one set branch instruction, the set of target registers holding target addresses in a live state is simultaneously incrementally updated.

4. A method according to claim 1, wherein the union of said set of target registers and said live range is taken to define target registers holding target addresses in a live state.

5. A method of operating a computer system to compile a computer program from a sequence of computer instructions, the method comprising:
   executing a dominator tree constructor function in the computer system to read in blocks said computer instructions including a plurality of first, set branch instructions which each identify a target address for a branch and a plurality of second, effect branch instructions which each implement a branch to the target address specified in the associated set branch instruction and to define a set of target registers associated with each block for holding target addresses for the set branch instructions in that block;
   executing a lifetime tracking algorithm to define as a live range of blocks a set of blocks for which a target address of a particular set branch instruction is in a live state, said lifetime tracking algorithm being operable to use said set of target registers and said live range to ensure that target registers holding target addresses in a live state are not available for other uses.

6. A method according to claim 5, which comprises the step of executing a migration function which migrates at least one set branch instruction to an ancestor node in the dominator tree.

7. A method according to claim 6, wherein said lifetime tracking algorithm is operable to define said live range of blocks on an incremental basis as the at least one set branch instruction is migrated.

8. A system to compile a computer program from a sequence of computer instructions, the compiler comprising:
   a dominator tree constructor for reading,in blocks, said computer instructions including a plurality of first, set branch instructions which each identify a target address for a branch and a plurality of associated second, effect branch instructions which implement a branch to the target address specified in the associated set branch instruction and for allocating each set branch instruction to an initial node in a dominator tree, said initial node being located in the block which contains the corresponding effect branch instruction;
   circuitry for defining a set of target registers associated with each block for holding target addresses for the set branch instructions in that block;
   circuitry for executing a lifetime tracking algorithm which defines as a live range of blocks a set of blocks for which a target address of a particular set branch instruction is in a live state, and which is arranged to use said set of target registers and said live range to ensure that target registers holding target addresses in a live state are not available for other uses.

9. The system according to claim 8, which comprises a migration function for migrating a set branch instruction to one of said ancestor nodes in the dominator tree.

10. The system according to claim 9, which comprises a determiner for determining the effect of migrating said set branch instruction to each of a set of ancestor nodes in the dominator tree based on a performance cost parameter.

* * * * *

UNITED STATES PATENT AND TRADEMARK OFFICE
CERTIFICATE OF CORRECTION

PATENT NO. : 7,155,707 B2
APPLICATION NO. : 09/977048
DATED : December 26, 2006
INVENTOR(S) : Stephen Clarke It is certified that error appears in the above-identified patent and that said Letters Patent is hereby corrected as shown below:

On the title page, item (73) should read:

(73) STMicroelectronics Limited
  Almondsbury Bristol, (GB)

Signed and Sealed this

Sixth Day of March, 2007

JON W. DUDAS
*Director of the United States Patent and Trademark Office*